(12) United States Patent
Tsuzuki (10) Patent No.: US 8,502,653 B2
(45) Date of Patent: Aug. 6, 2013

(54) VEHICLE-USE OBJECT DETECTION APPARATUS

(75) Inventor: Takeo Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 105 days.

(21) Appl. No.: 13/076,831

(22) Filed: Mar. 31, 2011

(65) Prior Publication Data

US 2011/0241858 A1   Oct. 6, 2011

(30) Foreign Application Priority Data

Mar. 31, 2010   (JP) .................................. 2010-083450

(51) Int. Cl.
*B60Q 1/00*   (2006.01)

(52) U.S. Cl.
USPC ........................... 340/435; 340/425.5; 701/96

(58) Field of Classification Search
None
See application file for complete search history.

(56) References Cited

U.S. PATENT DOCUMENTS

| | | | | |
|---|---|---|---|---|
| 6,431,001 | B1 * | 8/2002 | Tsuzuki et al. | 73/617 |
| 2002/0023498 | A1 * | 2/2002 | Tsuzuki et al. | 73/617 |
| 2002/0047780 | A1 * | 4/2002 | Nishimoto et al. | 340/540 |

FOREIGN PATENT DOCUMENTS

| | | |
|---|---|---|
| JP | 59-154380 | 9/1984 |
| JP | S63-033684 | 2/1988 |
| JP | 05-157850 | 6/1993 |
| JP | 2002-071805 | 3/2002 |
| JP | 2002-131428 | 5/2002 |
| JP | 2002-148347 | 5/2002 |
| JP | 2010-008095 | 1/2010 |
| JP | 2010008095 A * | 1/2010 |

OTHER PUBLICATIONS

Office action dated Mar. 12, 2012 in corresponding Japanese Application No. 2010-083450.
Office action dated Apr. 24, 2013 in corresponding Japanese Application No. 2010-083450.

* cited by examiner

*Primary Examiner* — Travis Hunnings
(74) *Attorney, Agent, or Firm* — Harness, Dickey & Pierce, PLC (57) ABSTRACT

The vehicle-use object detection apparatus includes a plurality of ultrasonic sensors mounted on a vehicle, each of the ultrasonic sensors being configured to receive a reflected version of an ultrasonic wave transmitted by itself and not to receive reflected versions of ultrasonic waves transmitted by the other ultrasonic sensors, a first determination means to make a determination whether an object is present around the vehicle based on the received reflected versions of the transmitted ultrasonic waves when a first detection condition is satisfied, and a second determination means to make a determination, for each of the ultrasonic sensors, whether there is adhesion of snow around the ultrasonic sensor based on an echo wave received by the ultrasonic sensor when a second detection condition different from the first detection condition is satisfied.

5 Claims, 10 Drawing Sheets

WAVEFROM WHEN NO OBJECT NOR SNOW ADHESION IS PRESENT

FIG.5B

WAVEFROM WHEN NO OBJECT IS PRESENT

FIG.5C

WAVEFROM WHEN SNOW ADHESION IS PRESENT

VEHICLE-USE OBJECT DETECTION APPARATUS

This application claims priority to Japanese Patent Application No. 2010-83450 filed on Mar. 31, 2010, the entire contents of which are hereby incorporated by reference.

BACKGROUND OF THE INVENTION

1. Field of the Invention

The present invention relates to a vehicle-use object detection apparatus including ultrasonic sensors.

2. Description of Related Art

There is known an ultrasonic type vehicle-use object detection apparatus including a plurality of ultrasonic sensors capable of detecting adhesion of snow or mud to the ultrasonic sensors. For example, refer to Japanese Patent Application Laid-open No. 2002-131428. The ultrasonic type vehicle-use object detection apparatus disclosed in this patent document has a structure where one of the ultrasonic sensors is disposed to receive a direct ultrasonic wave transmitted from at least another one of the ultrasonic sensors in order to detect the ultrasonic sensor(s) to which snow has adhered. This ultrasonic type vehicle-use object detection apparatus is configured to detect an obstacle on a road when the vehicle is running at a speed lower than 20 km/h, and to detect snow or mud when the vehicle is running at a speed higher than or equal to 20 km/h.

According to the above ultrasonic type vehicle-use object detection apparatus, it is possible not to equip the vehicle with specific sensors to detect snow or mud, because this apparatus is capable of detecting snow or mud using the ultrasonic sensors. However, this conventional ultrasonic type vehicle-use object detection apparatus has a problem in that erroneous detection of an obstacle is made frequently, because the ultrasonic sensors have to be arranged to receive their direct ultrasonic waves, respectively. Further, such an arrangement of the ultrasonic sensors may cause also erroneous detection of snow or mud, because the ultrasonic sensors easily detect external noise such as reflected sound waves from a guardrail of a road, a road surface or a succeeding vehicle, which constantly varies depending on the running environment of the vehicle.

SUMMARY OF THE INVENTION

An embodiment provides a vehicle-use object detection apparatus comprising:
  a plurality of ultrasonic sensors mounted on a vehicle, each of the ultrasonic sensors being configured to receive a reflected version of an ultrasonic wave transmitted by itself and not to receive reflected versions of ultrasonic waves transmitted by the other ultrasonic sensors;
  a first determination means to make a determination whether an object is present around the vehicle based on the received reflected versions of the transmitted ultrasonic waves when a first detection condition is satisfied;
  a second determination means to make a determination, for each of the ultrasonic sensors, that there is adhesion of snow around the ultrasonic sensor if a length of an echo wave received by the ultrasonic sensor is longer than or equal to a predetermined length when a second detection condition different from the first detection condition is satisfied; and
  a notification means to notify presence of an object around the vehicle based on a determination result by the first determination means, and to notify, for each of the ultrasonic sensors, presence of adhesion of snow around the ultrasonic sensor based on a determination result by the second determination means.

According to the present invention, there is provided a vehicle-use object detection apparatus capable of reliably detecting adhesion of snow around its ultrasonic sensors.

Other advantages and features of the invention will become apparent from the following description including the drawings and claims.

PREFERRED EMBODIMENTS OF THE INVENTION

First Embodiment

Figure 1:
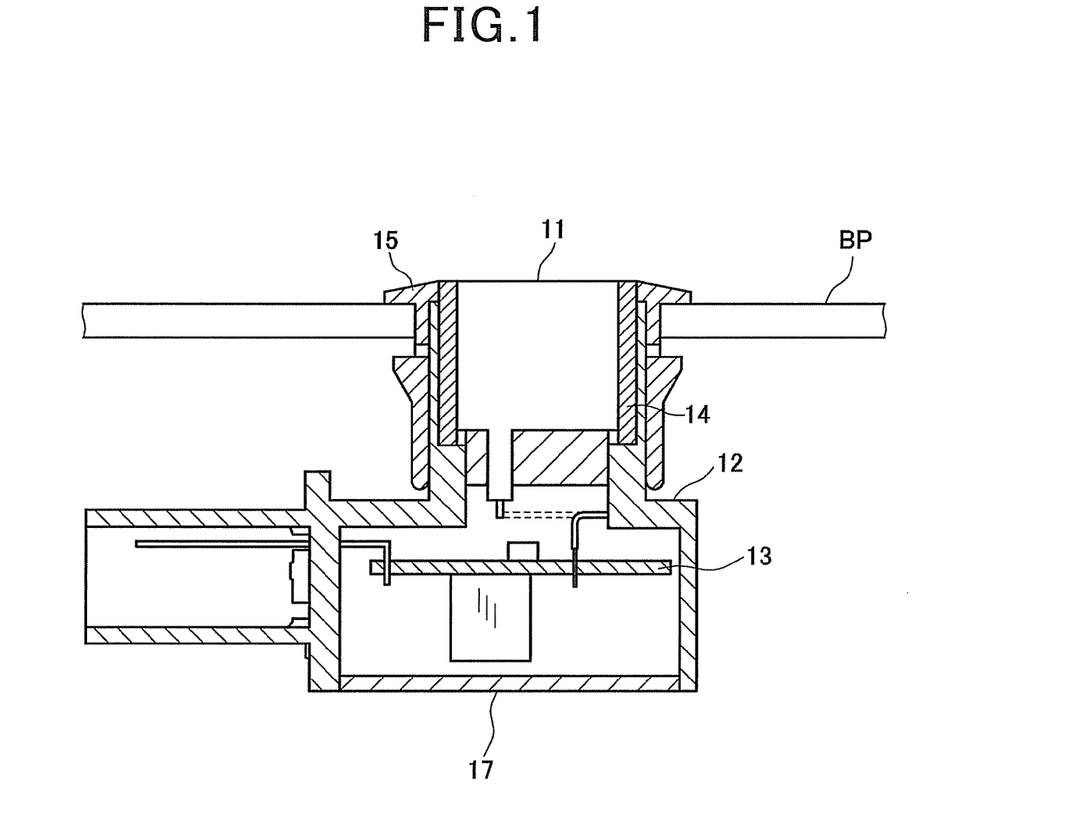
FIG. 1 is a cross-sectional view of an ultrasonic sensor for use in a vehicle-use object detection apparatus according to a first embodiment of the invention.

FIG. 1 shows an ultrasonic sensor unit (referred to simply as ultrasonic sensor hereinafter) 10 used in a vehicle-use object detection apparatus 1 according a first embodiment of the invention shown in FIGS. 2 and 3. The ultrasonic sensor 10 is of the two-way type, which can transmit an ultrasonic wave by vibrating its piezoelectric ceramic transducer, and convert an ultrasonic wave incident on the piezoelectric ceramic transducer into an electrical signal. The ultrasonic sensor 10 includes an ultrasonic microphone 11, a case 12 and a control circuit board 13.

The ultrasonic microphone 11, which incorporates the piezoelectric ceramic transducer, is housed in the case 12 together with a cushioning material 14.

The case 12, which is of the connector-integrated type, is assembled integrally to a vehicle bumper BP through an annular vessel 15 having a brim by a not shown spring member. The case 12 housing therein the ultrasonic microphone 11 and the control circuit board 13 and a filling material such as urethane is sealed by a cover 17.

Figure 2:
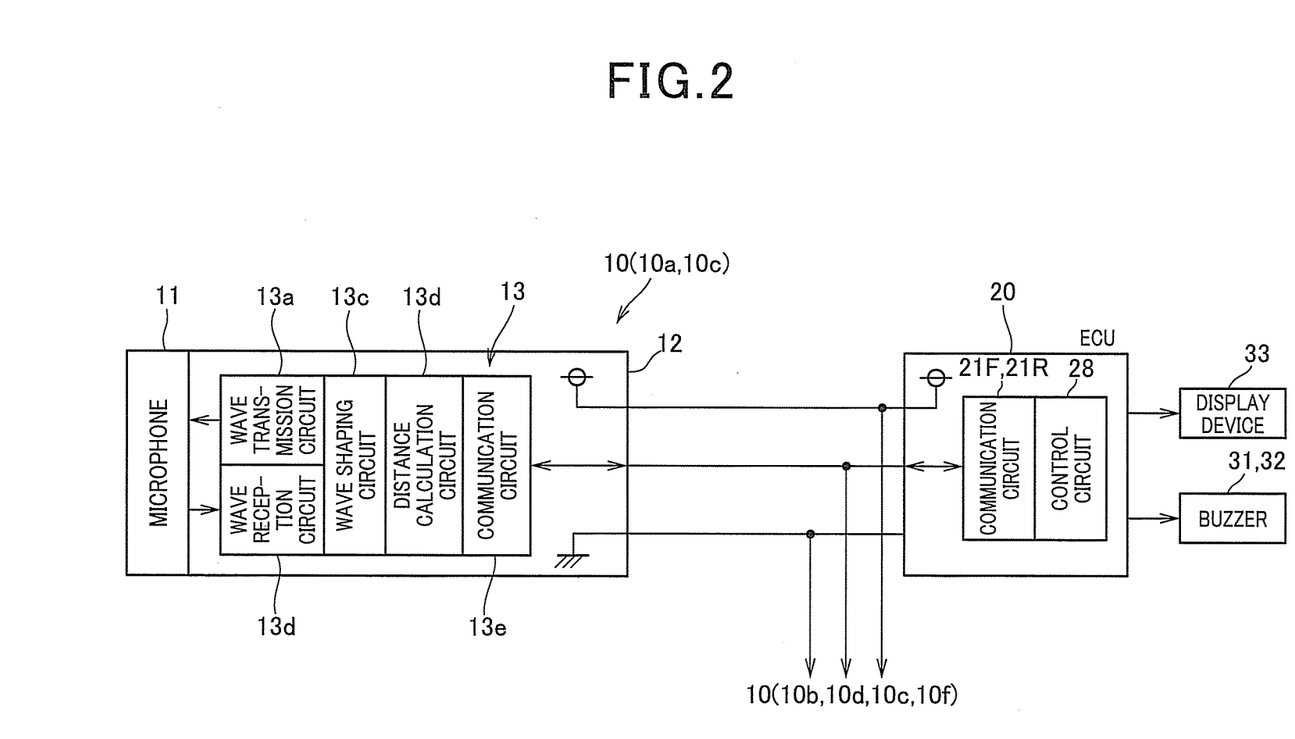
FIG. 2 is a schematic diagram showing the schematic structure of the vehicle-use object detection apparatus according to the first embodiment.

As shown in FIG. 2, the control circuit board 13 is formed with a wave transmission circuit 13a, a wave reception circuit 13b, a waveform shaping circuit 13c, a distance calculation circuit 13d and a communication circuit 13e. The wave transmission circuit 13a, which is for transmitting an ultrasonic wave, includes an oscillation circuit to generate an ultrasonic signal of 66.7 kHz, and a drive circuit to drive the piezoelectric ceramic transducer.

The wave reception circuit 13b, which is for receiving a reflected version of a ultrasonic wave transmitted by the wave transmission circuit 13a, includes a detector circuit constituted of an operational amplifier. The waveform shaping circuit 13c, which is for shaping a detection signal outputted from the wave reception circuit 13b, includes a rectifier circuit, a smoothing circuit, a filter circuit, a level detection circuit, etc.

The distance calculation circuit 13d is for measuring the time from when an ultrasonic wave is transmitted by the ultrasonic sensor to when the transmitted ultrasonic wave reaches the ultrasonic sensor after being reflected by an object in accordance with the waveform of the ultrasonic wave shaped by the waveform shaping circuit 13c, in order to calculate a distance to the obstacle, or calculate the length of an echo wave received by the ultrasonic sensor. The communication circuit 13e is for transmitting a detection signal (a serial signal, for example) indicative of the distance calculated by the distance calculation circuit 13d to an ECU (electronic control unit) 20.

Figure 3:
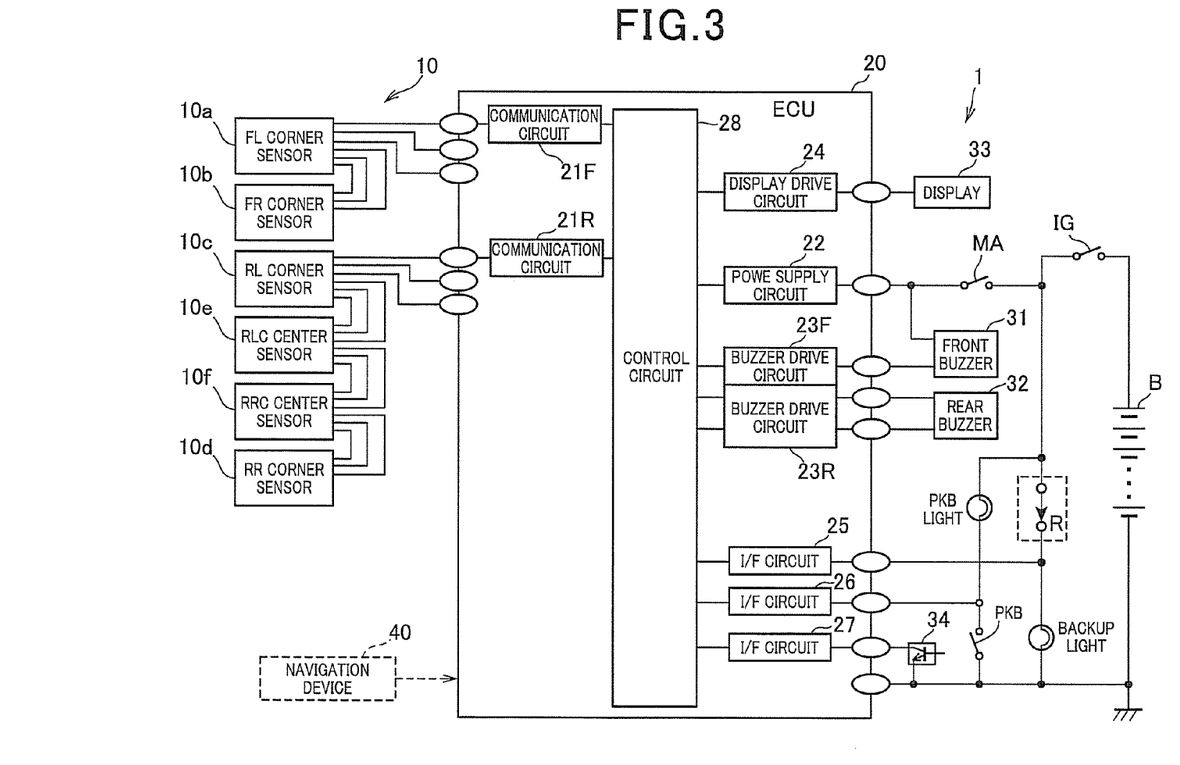
FIG. 3 is a block diagram showing the electrical structure of the vehicle-use object detection apparatus according to the first embodiment.

As shown in FIG. 3, the ultrasonic wave sensor 10 is disposed in a plurality of positions of each of the front bumper BP and the rear bumper BP of the vehicle. In more detail, the ultrasonic wave sensor 10 is disposed in each of the left corner position and the right corner position of the front bumper, as an FL corner (front left corner) sensor 10a and an FR corner (front right corner) sensor 10b, respectively. The ultrasonic wave sensor 10 is disposed also in each of the left corner position, the right corner position, the left center position and right center position of the rear bumper, as an RL corner (rear left corner) sensor 10c, an RR corner (rear right corner) sensor 10d, an RLC center (rear left center) sensor 10e and an RRC center (rear right center) sensor 10f, respectively.

Each of the sensors 10a to 10f is configured to receive a reflected version of an ultrasound wave transmitted from its own wave transmission circuit, and not to receive ultrasound waves transmitted from the wave transmission circuits of the other sensors.

Each of sensors 10a to 10f is provided with a plurality of (6, for example) terminals for connection with a power supply cable, a GND cable, and communication signal input and output cables. The terminals of the FL corner sensor 10a are connected to corresponding terminals of the ECU 20 through the signal cables, and also connected to corresponding terminals of the FR corner sensor 10b through the signal cables.

Likewise, the terminals of the RL corner sensor 10c are connected to corresponding terminals of the ECU 20 through the signal cables, and also connected to corresponding terminals of the RLC center sensor 10e through the signal cables. The terminals of the RLC center sensor 10e are also connected to corresponding terminals of the RRC center sensor 10f. The terminals of the RRC center sensor 10f are also connected to corresponding terminals of the RR corner sensor 10d.

The ECU 20 includes a communication circuits 21F and 21R, a power supply circuit 22, a buzzer drive circuits 23F and 23R, an display drive circuit 24, various IF circuits (interface circuits) 25 and 27, and the control circuit 28 for controlling these components.

The communication circuit 21F inputs detection signals received from the FL corner sensor 10a and FR corner sensor 10b to the control circuit 28. The communication circuit 21R inputs detection signals received from the RL corner sensor 10c, RR corner sensor 10d, RLC center sensor 10e and RRC center sensor 10f to the control circuit 28.

Figure 7:
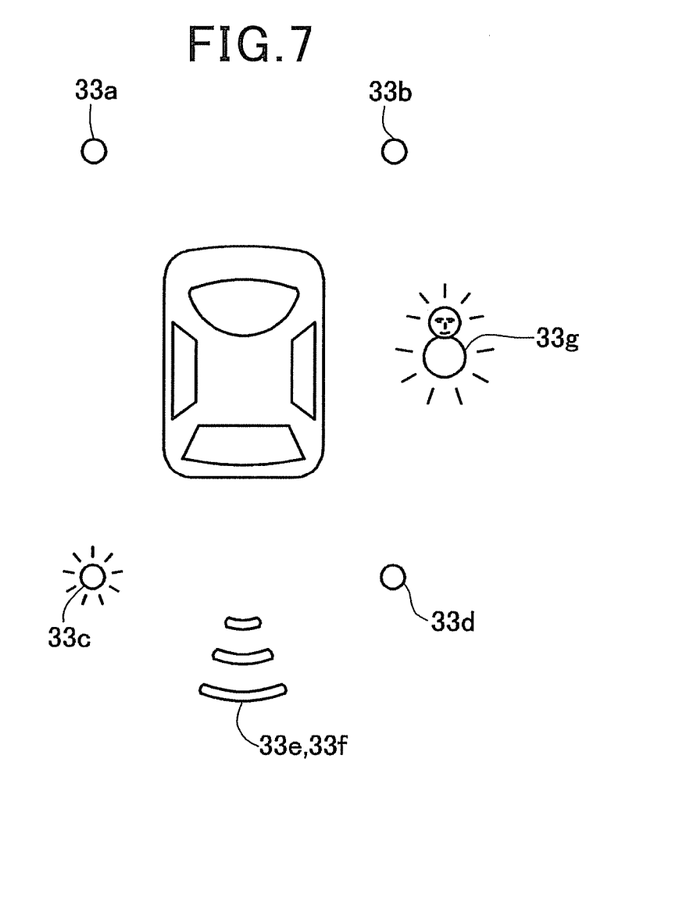
FIG. 7 is a diagram showing an example of the screen of a display device included in the vehicle-use object detection apparatus according to the first embodiment.

The power supply circuit 22 has a function of generating a constant voltage (5 V in this embodiment) from the battery voltage (12 V in this embodiment) of a battery B. The power supply circuit 22 is connected to the battery B through a main switch MA and an ignition switch IG. The buzzer drive circuit 23F supplies a drive current to a buzzer 31 installed in the front part of the vehicle cabin. The buzzer drive circuit 23R supplies a drive current to a buzzer 32 installed in the rear part of the vehicle cabin. The display drive circuit 24 supplies a drive current to a display device 33 mounted on an operation panel installed in the vehicle cabin. As shown in FIG. 7, the display device 33 includes indication lights 33a to 33f located at positions respectively corresponding to the positions of the sensors 10a to 10f, and an indication light for indication of presence of snow adhesion. The display image of the indication light 33a is not limited to the one shown in FIG. 7. It may be an image of a crystal of snow.

The IF circuit 25 supplies the control circuit 28 with an R range (reverse range) signal when the shift lever of the transmission of the vehicle is shifted to the R range for indication of the shift lever being in the R range. The IF circuit 26 supplies the control circuit 28 with a P range (parking range) signal when the shift lever is shifted to the P range for indication of the shift lever being in the P range. The IF circuit 27 inputs a signal indicative of the vehicle speed detected by a vehicle speed sensor 34 to the control circuit 28. Incidentally, when the P range signal is not available, an ON signal of a parking brake switch PKB may be used instead of the P range signal.

The control circuit 28 is mainly constituted of a CPU, a ROM, a RAM, a nonvolatile memory such as a flash memory, an I/O, an A/D conversion section and an D/A conversion section. The control circuit 28 executes a snow adhesion detection program shown in FIG. 4 stored in the ROM at regular time intervals after the main switch MA and the ignition switch IG are turned on, and outputs the drive signals to the buzzer drive circuits 23F and 23R and the display drive circuit 24 in accordance with the results of the execution of the snow adhesion detection program.

Figure 4:
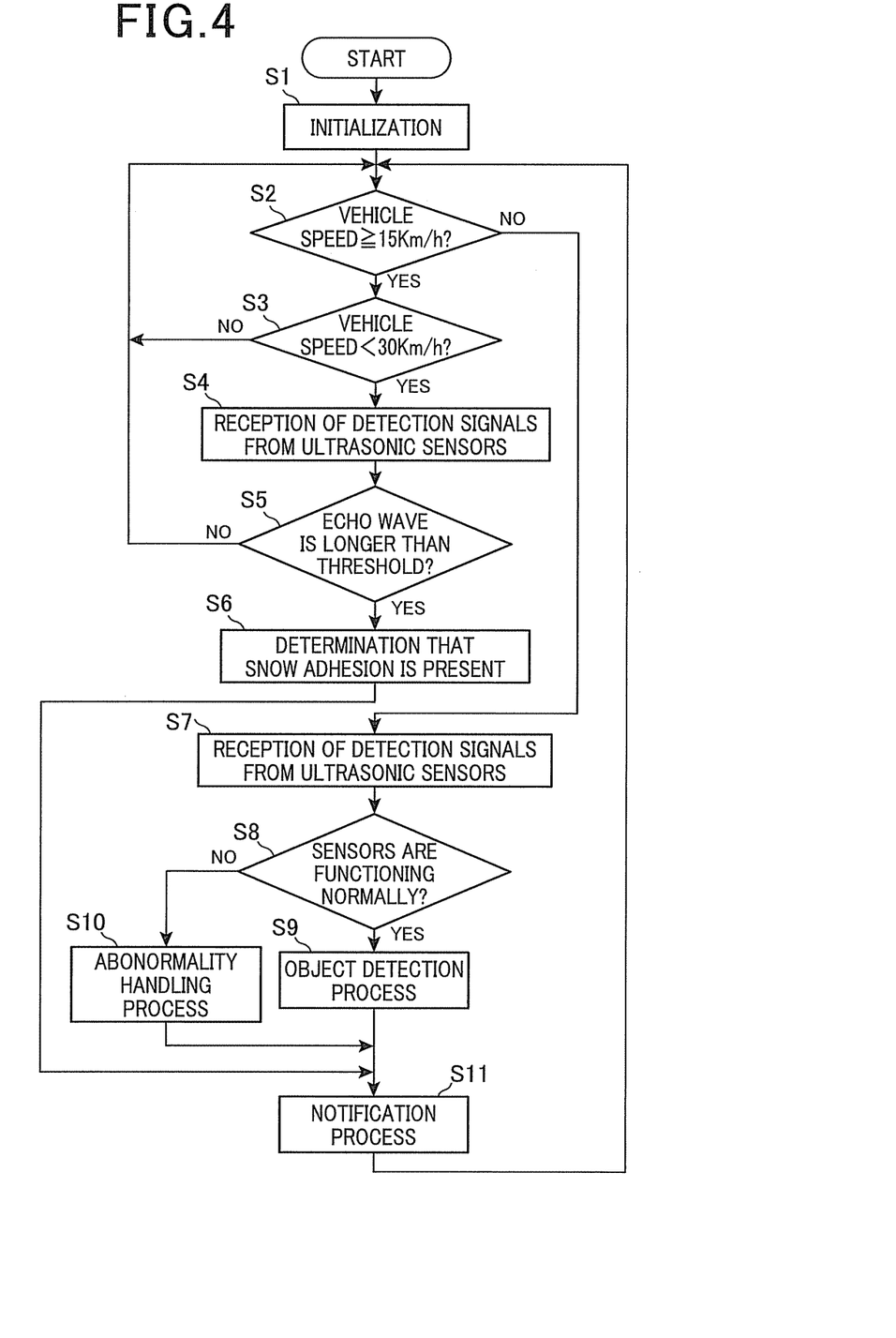
FIG. 4 is a flowchart showing a program for detecting an object or snow performed by a control circuit included in the vehicle-use object detection apparatus according to the first embodiment.

Next, the operation of the vehicle-use object detection apparatus 1 having the above described structure is explained. When the vehicle driver turns on the main switch MA and the ignition switch IG, the control circuit 28 starts executing the snow adhesion detection program.

This snow adhesion detection program begins by performing an initialization process at step S1. Thereafter, the program determines in which range the vehicle speed is based on the detection signal outputted from the vehicle speed sensor 34. More specifically, it is determined whether or not the vehicle speed is higher than or equal to a first predetermined speed (15 km/h in this embodiment) in step S2, and it is determined whether or not the vehicle speed is lower than a second predetermined speed (30 km/h in this embodiment) in step S3. This embodiment is configured to detect an object when the vehicle speed is lower than 15 km/h (NO in step S2), and to detect snow adhesion when the vehicle speed is higher than or equal to 15 km/h and lower than 30 km/h (YES in step S5).

If the determination result in step S2 is negative, that is, if the vehicle speed is lower than 15 km/h, the program proceeds to step S7. In step S7, the control circuit 28 receives the detection signals from the corner sensors 10a to 10d, and further receives the detection signal from the center sensors 10e and 10f when the shift lever is shifted to the R range.

Figure 5A:
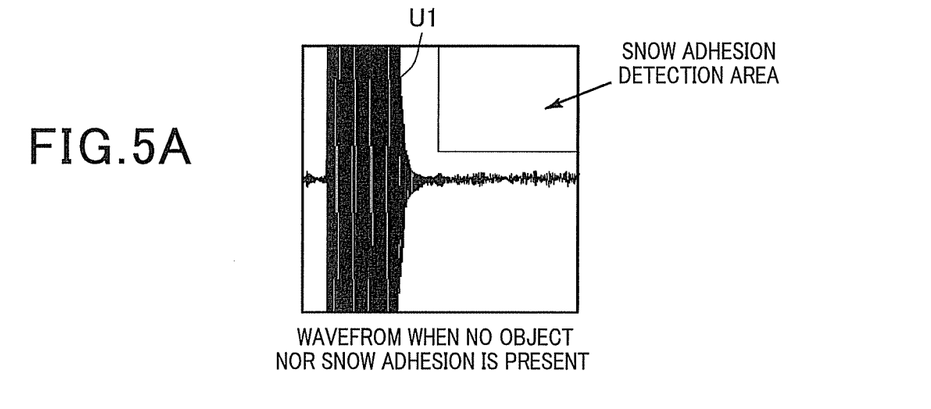
FIGS. 5A to 5C are diagrams showing waveforms of ultrasonic waves from the ultrasonic sensor.

Subsequently, the program proceeds to step S8 to determine whether or not the sensors 10a to 10d are functioning normally. If the determination result in step S8 is affirmative, the program proceeds to step S9 to perform an object detection process, and then proceeds to step S11. In more detail, when none of the sensors 10a to 10d receives a reflected version of an ultrasonic wave transmitted from its own wave transmission circuit as shown in FIG. 5A, the control circuit 28 keeps the front and rear buzzers 31 and 32 and the display device 33 in the non-active state in step S11.

Figure 5B:
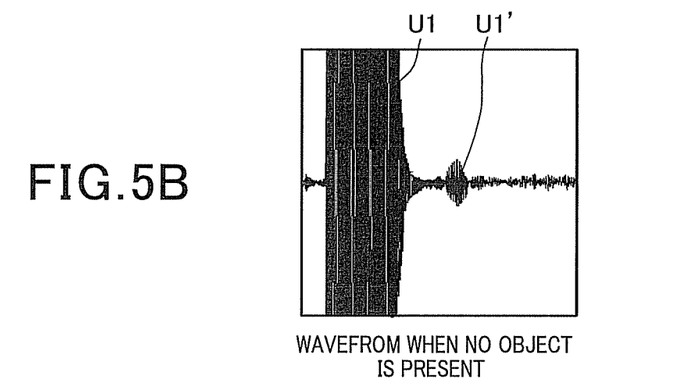

On the other hand, when at least one of the sensors 10a to 10d receives a reflected version of an ultrasonic wave transmitted from its own wave transmission circuit as shown in FIG. 5B, the control circuit 28 determines the sound aspect (discontinuous sounds, short discontinuous sounds or a continuous sound, for example) of the buzzers 31 and 32, and the display aspect (discontinuous lighting or continuous lighting, for example) of the display device 33a to 33f, and outputs drive signals to the buzzer drive circuits 23F and 23R, and the display drive circuit 24 to effect the determined aspects in step S11.

If the determination result in step S8 is negative, the program proceeds to step S10 to perform a sensor abnormality handling process (a process to write diag data, for example) without performing the object detection process.

If the determination result in step S2 is affirmative, and the determination result in step S3 is affirmative, that is, if the vehicle speed is higher than or equal to 15 km/h and lower than 30 km/h, the program proceeds to step S4. In step S4, the control circuit 28 receives the detection signals from the sensors 10a to 10f.

Figure 5C:
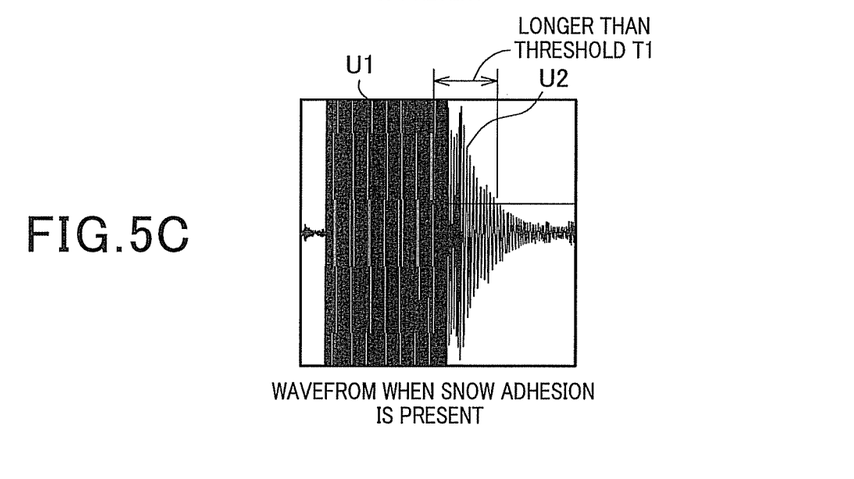

Subsequently to step S4, the program proceeds to step S5 to determine whether or not the length of an echo wave U2 received by the wave reception circuit is longer than or equal to a threshold T1 as shown in FIG. 5C in at least one of the sensors 10a to 10f. If the determination result in step S5 is affirmative, the program proceeds to step S6 to make a determination that there is snow adhesion around the sensor that has received the echo wave U2.

Generally, as shown in FIG. 5B, when snow has adhered to the ultrasonic sensor 10, this sensor 10 receives an echo wave whose magnitude is larger than that of a reflected version U1' of an ultrasonic wave U1 transmitted from this sensor 10 and reflected by an object to be detected. As a result, the sensor 10 detects the echo wave U2 longer than the threshold T1 and having a magnitude larger than a predetermined value which is present in a predetermined snow adhesion detection area (see FIG. 5A).

Figure 6:
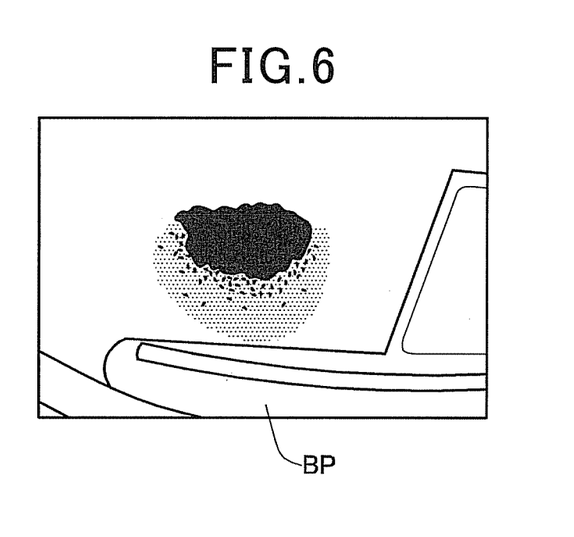
FIG. 6 is a diagram showing a state where snow has adhered around the ultrasonic sensor.

Subsequent to step S6, the program proceeds to step S11 where the drive signal is applied to the buzzer drive circuit 23F or 23R so that the buzzer 31 or 32 corresponding to the position of the sensor determined to be adhered with snow generates a continuous sound, and the drive signal is applied to the display drive circuit 24 so that the indication light 33g and one of the indication lights 33a to 33f corresponding to the position of the sensor determined to be adhered with snow flicker, for example. For example, when there is snow adhesion to the RL corner sensor 10c as shown in FIG. 6, the drive signal is applied to the buzzer drive circuit 23R so that the rear buzzer 32 generates a continuous sound, and also the drive signal is applied to the display drive circuit 24 so that the indication lights 33c and 33g flicker.

If the determination result in step S3 is negative, that is, if the vehicle speed is higher than 30 km/h, the program returns to step 2 without performing step S4 and subsequent steps, because noise components detected in the sensors 10a to 10f are large when the vehicle runs at a speed higher than 30 km/h. Also, if the determination result in step S5 is negative, the program returns to step S2 without performing step S4 and subsequent steps.

As described above, in the first embodiment, the ultrasonic sensors 10 are disposed such that each of them receives a reflected version of a ultrasonic wave transmitted from its own wave transmission circuit, however, does not receive reflected versions of ultrasonic waves transmitted from the wave transmission circuits of the other ultrasonic sensors 10.

This makes it possible to prevent erroneous detection of an object due to cross reception of the direct ultrasonic waves among the ultrasonic sensors 10.

In the first embodiment, if the determination result in step S2 is negative, the control circuit 28 performs steps S7 to S9 to detect an object present near the vehicle, and if the determination results in steps S2 and S3 are both affirmative, the control circuit 28 performs steps S4 to S6 to detect adhesion of snow around the ultrasonic sensors 10 based on the length of the echo wave U2.

Hence, according to the first embodiment, the timing to detect an object and the timing to detect show adhesion can be separated, and adhesion of snow can be detected accurately in the simple way using the length of the echo wave U2.

The first embodiment is configured to determine that there is snow adhesion if the condition that the length of the echo wave U2 is longer that the predetermined value is satisfied. However, the first embodiment may be modified to determine that there is snow adhesion if, in addition to or in place of this condition, a condition that a proportion of the echo wave within a predetermined echo detection period is higher than a predetermined ratio (70%, for example), to further improve the accuracy of detection of snow adhesion.

Second Embodiment

Figure 8:
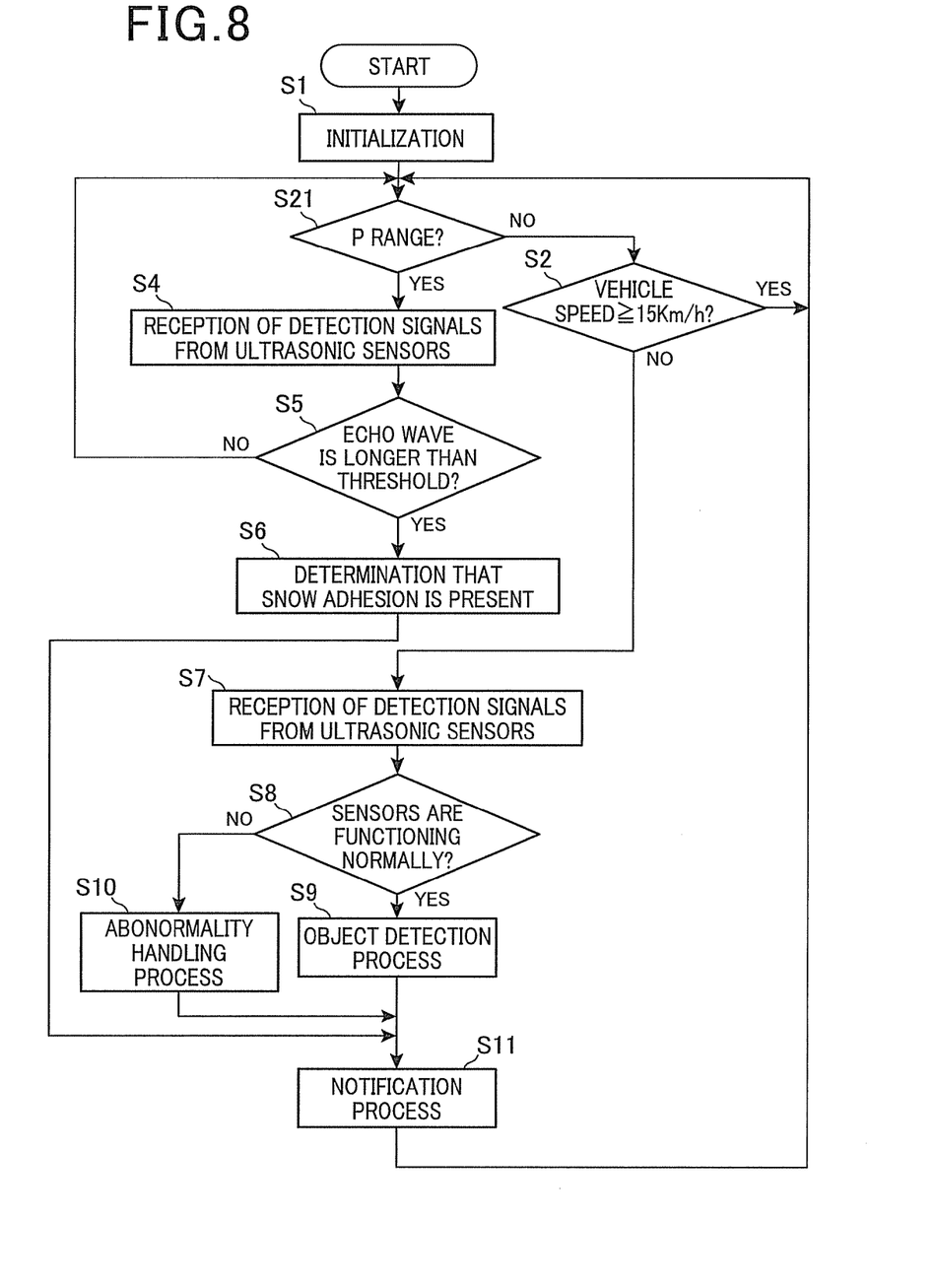
FIG. 8 is a flowchart showing a program for detecting an object or snow performed by a control circuit included in a vehicle-use object detection apparatus according to a second embodiment of the invention.

Next, a second embodiment of the invention is described. The first embodiment is configured to perform detection of snow adhesion when the vehicle speed is determined to be in the predetermined range by steps S2 and S3. As shown in FIG. 8, the second embodiment has a different configuration that step S4 and subsequent steps are performed when the shift lever is in the P range (YES in step S21) to detect snow adhesion, and step S7 and subsequent steps are performed when the shift lever is in a range other than the P range, and the vehicle speed is lower than a predetermined speed (15 km/h, for example, that is, YES in step S21) to detect an object. The second embodiment is the same as the first embodiment other than the above.

Also according to the second embodiment, the timing to detect an object and the timing to detect show adhesion can be separated, and adhesion of snow can be detected accurately.

Third Embodiment

Figure 9:
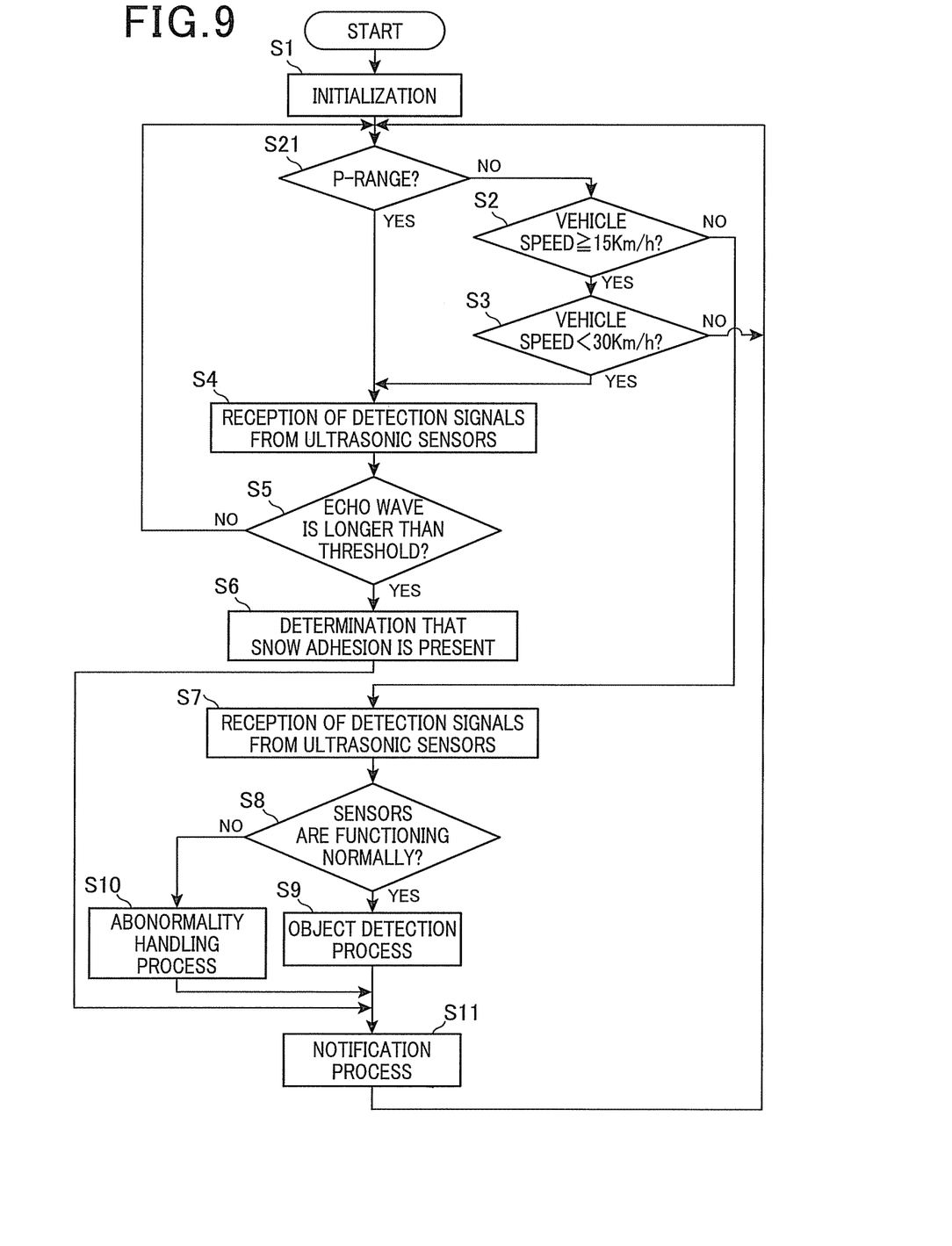
FIG. 9 is a flowchart showing a program for detecting an object or snow performed by a control circuit included in a vehicle-use object detection apparatus according to a third embodiment of the invention.

Next, a third embodiment of the invention is described. As shown in FIG. 9, the third embodiment is configured to perform step S4 and subsequent steps when the shift lever is in the P range (YES in step S21), or when the shift lever is in a range other than the P-range and the vehicle speed is in a predetermined range (higher than or equal to 15 km/h and lower than 30 km/h, for example, that is, NO in step S21 and YES in step S3). The third embodiment is the same as the first embodiment other than the above.

Also according to the third embodiment, the timing to detect an object and the timing to detect snow adhesion can be separated, and adhesion of snow can be detected accurately.

Fourth Embodiment

Figure 10:
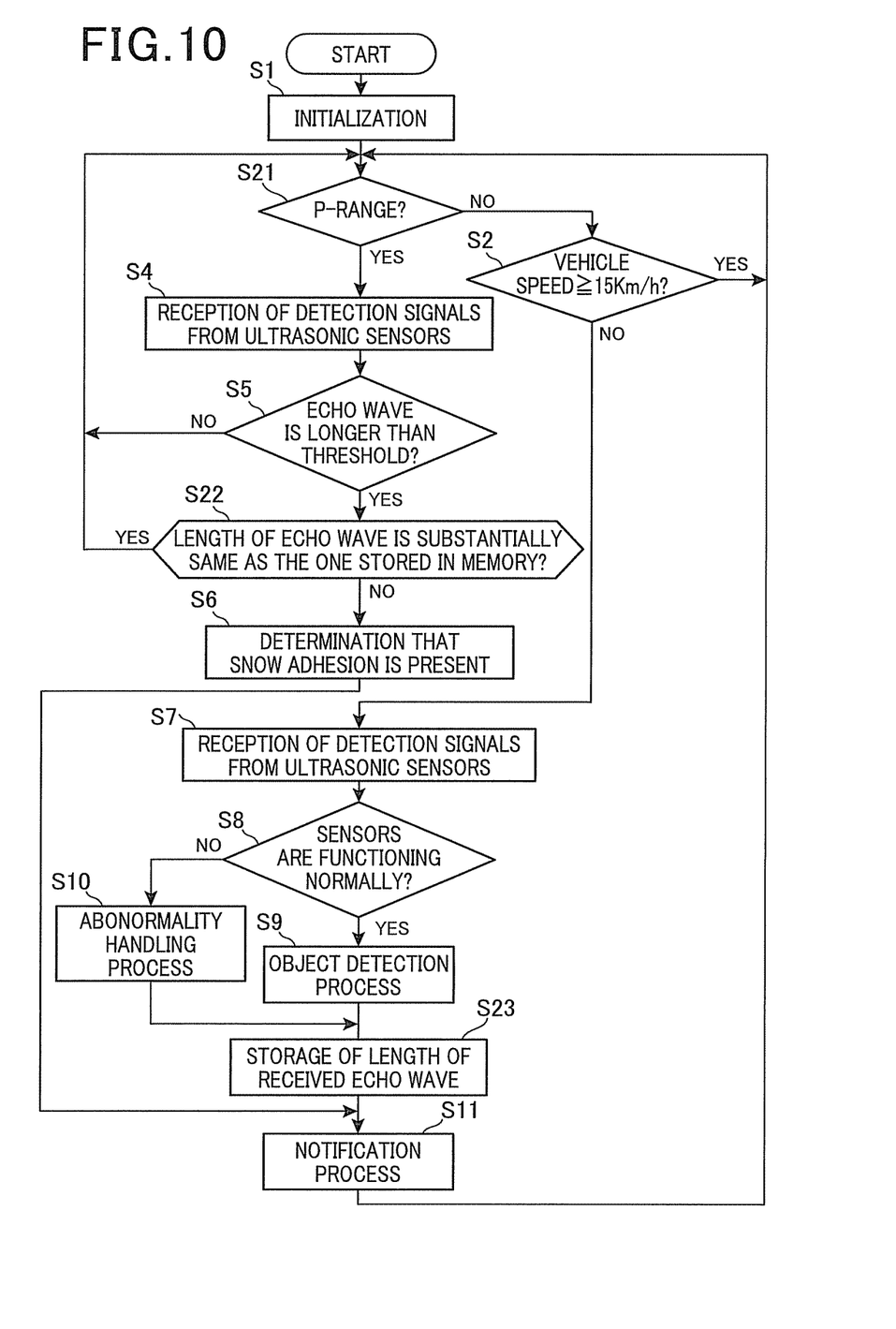
FIG. 10 is a flowchart showing a program for detecting an object or snow performed by a control circuit included in a vehicle-use object detection apparatus according to a fourth embodiment of the invention.

Next, a fourth embodiment of the invention is described. The second and third embodiments are configured to determine that there is adhesion of snow around the ultrasonic sensor if the length of the echo wave U2 received by at least one of the sensors 10a to 10f is detected to be longer than or equal to the threshold T1 by steps S5 and S6. As shown in FIG. 10, the fourth embodiment is configured to additionally determine that, if the length of the echo wave U2 is substantially the same (±1 ms, for example) as that of an echo wave having been stored in the memory of the control circuit 28, there is no adhesion of snow around the sensor that has received the echo wave U2. That is, in the fourth embodiment, it is determined that there is adhesion of snow only when the length of the received echo wave is longer than or equal to the threshold T1, and is different from the length having been stored in the memory. The fourth embodiment is the same as the first embodiment other than the above.

For example, suppose the vehicle is parked in a space with a simple roof when it is snowing. In this situation, according to the embodiments 2 and 3, the determination whether the length of the echo wave U2 is longer than or equal to the threshold T1 is made in steps S21, S4 and S5 when the shift lever is in the P range.

However, there may occur a case where although the ultra sonic sensor 10 receives an echo wave from an object other than snow, it us determined that the echo wave U2 due to snow adhesion has been detected, depending on the length of the length of the received echo wave. To eliminate such a drawback, the fourth embodiment is configured to store the length of a received echo wave (step S23) in the memory after completion of the object detection process in step S9 performed while the vehicle is parked, makes a determination whether the length of an echo wave received after step S5 at the time of start of the vehicle is substantially the same as that stored in the memory (step S22), and determines that there is no adhesion of snow even when the length of the received echo wave is longer than the threshold T1 if the determination result in step S22 is affirmative, assuming that the received echo wave is due to an object other than snow.

According to the fourth embodiment, in addition to the advantages provided by the second and third embodiments, the advantage that erroneous detection of snow adhesion can be prevented is not obtained.

Further, when a large object such as a wall is present in the vicinity of the vehicle, it is likely that a long echo wave is received due to the large object. In this case, it is likely that a ultrasonic wave reflected from the large object is received also by the other ultrasonic sensors as the echo wave. Accordingly, the above embodiments may be modified to determine that there is snow adhesion on condition that the other sensors do not receive the echo wave. For example, when the length of the echo wave U2 received by the RL corner sensor 10c is long, it is determined that there is snow adhesion only if the RLC center sensor 10e does not detect any object, and otherwise, it is determined that a large object is present in the vicinity of the vehicle.

Fifth Embodiment

Figure 11:
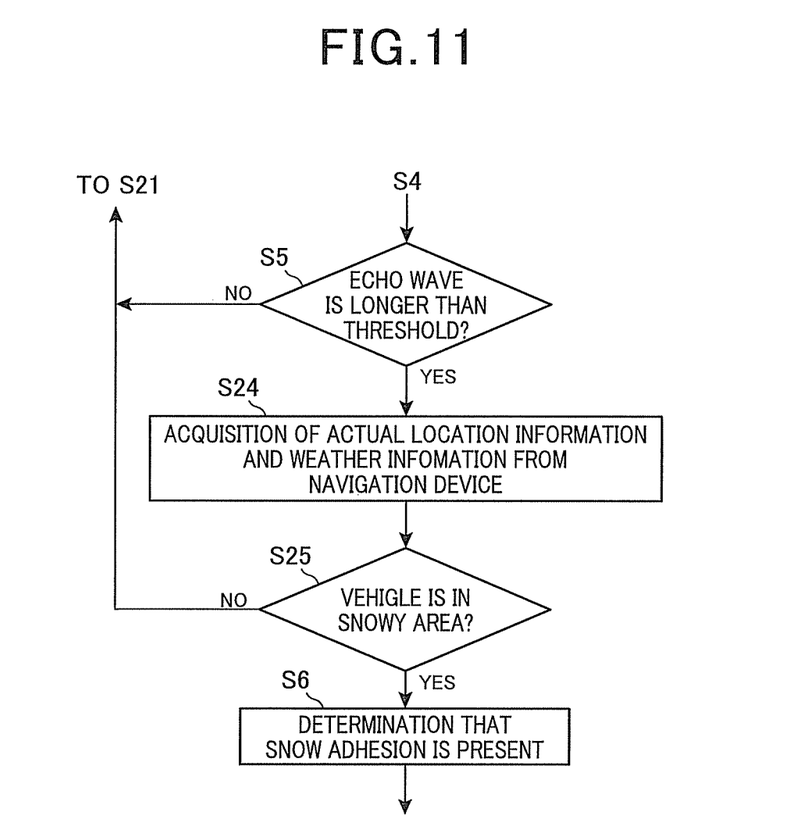
FIG. 11 is a flowchart showing a program for detecting an object or snow performed by a control circuit included in a vehicle-use object detection apparatus according to a fifth embodiment of the invention.

The determination whether there is snow adhesion around the ultrasonic sensors is made based on the determination result in step S5 for the first to third embodiments, and based on the determination results in steps S5 and S22 for the fourth embodiment. However, a fifth embodiment of the invention is configured to determine whether there is snow adhesion around the ultrasonic sensors based on, in addition to the determination result in step S5 or determination results in steps S5 and S22, information transmitted from a navigation device 40 communicably connected to the ECU 20 as shown in FIG. 11. The fifth embodiment is the same as the first embodiment other than the above.

In the fifth embodiment, the control circuit 28 acquires information on the actual location of the vehicle and weather information from the navigation device 40 in step S24 after completion of step S5, and determines that there is snow adhesion around the ultrasonic sensors 10 in step S6 on condition that that the vehicle is detected to be in a snowy area, or more preferably upon detecting that the vehicle is in an area in which snowfall is expected at high probability in step S25.

According to the fifth embodiment, it is possible to prevent erroneous detection of snow adhesion more reliably.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use object detection apparatus comprising:
a plurality of ultrasonic sensors mounted on a vehicle, each of the ultrasonic sensors being configured to receive a reflected version of an ultrasonic wave transmitted by itself;
a first determination unit to make a determination whether an object is present around the vehicle based on the received reflected versions of the transmitted ultrasonic waves when a first detection condition is satisfied;
a second determination unit to make a determination, for each of the ultrasonic sensors, that there is adhesion of snow around the ultrasonic sensor upon detecting that an echo wave having a length longer than a predetermined threshold and a magnitude larger than a predetermined value is present in a predetermined snow adhesion detection area thereof when a second detection condition different from the first detection condition is satisfied; and
a notification unit to notify presence of an object around the vehicle based on a determination result produced by the first determination unit, and to notify, for each of the ultrasonic sensors, presence of adhesion of snow around the ultrasonic sensor based on a determination result produced by the second determination unit.

2. The vehicle-use object detection apparatus according to claim 1, wherein the first condition is that a vehicle speed is lower than a predetermined first speed, and the second condition is that the vehicle speed is higher than or equal to the predetermined first speed and lower than a predetermined second speed, the second determination unit being configured to stop operation while the vehicle exceeds the predetermined second speed.

3. The vehicle-use object detection apparatus according to claim 1, wherein the first condition is that a shift lever of the vehicle is in a range other than a parking range, and the second condition is that the shift lever is in the parking range.

4. The vehicle-use object detection apparatus according to claim 1, further comprising a storage unit to store a length of an echo wave received while the vehicle is parked for each of the ultrasonic sensors, the second determination unit being configured to determine that there is no adhesion of snow if a length of an echo wave received after the vehicle starts moving is the same as the length of the echo wave stored in the storage unit.

5. The vehicle-use object detection apparatus according to claim 3, wherein the second determination unit is configured to acquire an actual position information of the vehicle and weather information, and make a determination that there is adhesion of snow around the ultrasonic sensor on condition that the vehicle is detected to be in a snowy area based on the acquired actual position information and the weather information.

\* \* \* \* \*